(12) United States Patent
Yim et al.

(10) Patent No.: US 12,177,358 B2
(45) Date of Patent: Dec. 24, 2024

(54) APPARATUS AND METHOD FOR PROCESSING DISTRIBUTED CONSENSUS USING MULTI-SIGNATURE

(71) Applicant: ELECTRONICS AND TELECOMMUNICATIONS RESEARCH INSTITUTE, Daejeon (KR)

(72) Inventors: Jong-Choul Yim, Daejeon (KR); Jin-Tae Oh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 231 days.

(21) Appl. No.: 17/860,001

(22) Filed: Jul. 7, 2022

(65) Prior Publication Data
US 2023/0188356 A1    Jun. 15, 2023

(30) Foreign Application Priority Data

Dec. 15, 2021 (KR) .......................... 10-2021-0180097

(51) Int. Cl.
*H04L 9/32*      (2006.01)
*H04L 9/08*      (2006.01)

(52) U.S. Cl.
CPC .......... *H04L 9/3242* (2013.01); *H04L 9/0825* (2013.01); *H04L 9/3247* (2013.01)

(58) Field of Classification Search
None
See application file for complete search history.

(56) References Cited

U.S. PATENT DOCUMENTS 10,671,599 B2    6/2020    Yang
11,343,073 B2    5/2022    Oh
(Continued)

FOREIGN PATENT DOCUMENTS

KR    10-2020-0144466 A    12/2020
KR       10-2193549 B1    12/2020
(Continued)

OTHER PUBLICATIONS

P. M. Hallam-Baker, "Threshold Signatures Using Ed25519 and Ed448," Jan. 5, 2020.
(Continued)

*Primary Examiner* — Fatoumata Traore

(57) ABSTRACT

Disclosed herein are an apparatus and method for distributed consensus using multi-signature. The apparatus includes one or more processors and executable memory for storing at least one program executed by the one or more processors. The at least one program may send a Pre-Prepare message for processing distributed consensus on a transaction to nodes participating in the distributed consensus in a blockchain network, verify the nodes using message authentication code values included in Prepare messages received from the nodes, send the nodes an A-Prepare message for announcing that the Prepare messages are received from a number of verified nodes equal to or greater than a quorum required for the distributed consensus, generate a multi-signature value using multi-signature fragment values included in Commit messages received from the nodes, and send an A-Commit message including the multi-signature value to the nodes, thereby processing consensus on the transaction.

15 Claims, 4 Drawing Sheets

(56) References Cited

U.S. PATENT DOCUMENTS

| | | |
|---|---|---|
| 2012/0036364 A1 | 2/2012 | Yoneda et al. |
| 2019/0327084 A1 | 10/2019 | Oh |
| 2019/0379538 A1 | 12/2019 | Oh |
| 2020/0004643 A1* | 1/2020 | Yang .................. G06F 11/1438 |
| 2020/0389310 A1 | 12/2020 | Karame |
| 2020/0403776 A1* | 12/2020 | Oh ....................... H04L 9/3247 |
| 2021/0303550 A1 | 9/2021 | Yang |
| 2021/0344501 A1* | 11/2021 | Li ........................ H04L 9/3239 |

FOREIGN PATENT DOCUMENTS

| | | | |
|---|---|---|---|
| KR | 10-2299743 B1 | 9/2021 | |
| WO | 2010/067812 A1 | 6/2010 | |
| WO | WO-2020232200 A1 * | 11/2020 | ............. G06F 21/64 |

OTHER PUBLICATIONS

The ZILLIQA Team, "The ZILLIQA Technical Whitepaper," Aug. 10, 2017.
Jia Luo et al., "Blockchain-Enabled Software-Defined Industrial Internet of Things With Deep Reinforcement Learning," IEEE Internet of Things Journal, Jun. 2020, vol. 7, No. 6.

\* cited by examiner

APPARATUS AND METHOD FOR PROCESSING DISTRIBUTED CONSENSUS USING MULTI-SIGNATURE

CROSS REFERENCE TO RELATED APPLICATION

This application claims the benefit of Korean Patent Application No. 10-2021-0180097, filed Dec. 15, 2021, which is hereby incorporated by reference in its entirety into this application.

BACKGROUND OF THE INVENTION

1. Technical Field

The present disclosure relates generally to blockchain technology, and more particularly to technology for distributed consensus using multi-signature.

2. Description of the Related Art

The Practical Byzantine-Fault-Tolerant (PBFT) protocol is a protocol configured such that, in a distributed system configured with multiple nodes, the state of the system is agreed on and updated through exchange of messages between the nodes. The PBFT protocol is widely used in distributed systems that require safe transaction processing.

With the recent development of blockchain technology, the popularity of use of the PBFT protocol as a blockchain consensus protocol is increasing. Particularly, in a permissioned blockchain system configured with several or tens of nodes, the protocol can be applied thereto without a major change by taking a form in which all nodes participate in consensus. In contrast, in a permissionless blockchain system having thousands to tens of thousands of nodes, it is very impractical for all of the nodes to participate in consensus using the PBFT protocol due to a performance problem. Because the PBFT protocol is configured such that all nodes exchange messages in a one-to-one manner in a message exchange process for consensus, message complexity (the index indicating the number of messages sent and received for consensus) is $O(N^2)$. Here, N denotes the number of nodes. For example, if the number of nodes is 1,000, a message has to be exchanged at least 1,000,000 times. Because performance sharply decreases with an increase in the number of nodes, it is undesirable to apply the PBFT protocol when the number of nodes is large.

In order to solve this problem, a method in which, rather than involving all nodes in consensus, a kind of committee is formed by selecting some of the nodes and only the members of the committee participate in consensus through digital signatures using the PBFT protocol has been proposed.

However, because validation of digital signatures consumes a large amount of computing resources, when the number of nodes forming the committee increases, not only the time taken for consensus but also the time taken to process a transaction on which the nodes agree may significantly increase due to the cost of validating a large number of digital signatures by general nodes.

Furthermore, when a distributed system is formed in the Internet environment, network latency may occur, which further increases the consensus delay time. The increased consensus delay time may cause significant performance degradation in transaction processing.

Meanwhile, Korean Patent Application Publication, No. 10-2020-0144466, titled "Apparatus and method for decentralized Byzantine-fault-tolerance-based distributed consensus", discloses an apparatus and method for performing distributed consensus between a large number of decentralized nodes by making the exchange of messages lightweight while accommodating a Byzantine-Fault-Tolerance (BFT)-based distributed consensus protocol by centralized nodes.

SUMMARY OF THE INVENTION

An object of the present disclosure is to minimize the consensus delay time required for agreement on a block in a blockchain network and to improve transaction-processing performance.

In order to accomplish the above objects, an apparatus for distributed consensus using multi-signature according to an embodiment of the present disclosure includes one or more processors and executable memory for storing at least one program executed by the one or more processors. The at least one program may be configured to send a Pre-Prepare message for processing distributed consensus on a transaction to nodes participating in the distributed consensus in a blockchain network, to verify the nodes using message authentication code values included in Prepare messages received from the nodes, to send the nodes an A-Prepare message for announcing that the nodes are verified and that the Prepare messages are received from a number of verified nodes equal to or greater than a quorum required for the distributed consensus, to generate a multi-signature value using multi-signature fragment values included in Commit messages received from the nodes, and to send an A-Commit message including the multi-signature value to the nodes, thereby processing consensus on the transaction.

Here, the at least one program may acquire the public keys of the nodes from a node information table stored in advance and verify the nodes by comparing message authentication codes generated from the public keys with the message authentication code values included in the Prepare messages.

Here, the at least one program may sign the A-Prepare message with the private key thereof.

Here, the at least one program may verify the nodes using message authentication codes included in the Commit messages. Here, the multi-signature fragment values may be generated from the private keys of the nodes participating in the distributed consensus.

Here, the multi-signature value may be generated using a combination of the sum of the multi-signature fragment values and a random number.

Also, in order to accomplish the above objects, a method for distributed consensus using multi-signature, performed by an apparatus for distributed consensus using multi-signature, according to an embodiment of the present disclosure includes sending a Pre-Prepare message for processing distributed consensus on a transaction to nodes participating in the distributed consensus in a blockchain network, verifying the nodes using message authentication code values included in Prepare messages received from the nodes, sending the nodes an A-Prepare message for announcing that the nodes are verified and that the Prepare messages are received from a number of verified nodes equal to or greater than a quorum required for the distributed consensus, generating a multi-signature value using multi-signature fragment values included in Commit messages received from the nodes, and sending an A-Commit message including the multi-signature value to the nodes, thereby processing consensus on the transaction.

Here, verifying the nodes may comprise acquiring the public keys of the nodes from a node information table stored in advance and verifying the nodes by comparing message authentication codes generated from the public keys with the message authentication code values included in the Prepare messages.

Here, sending the A-Prepare message may comprise signing the A-Prepare message with the private key of the apparatus.

Here, generating the multi-signature value may comprise verifying the nodes using message authentication codes included in the Commit messages.

Here, the multi-signature fragment values may be generated from the private keys of the nodes participating in the distributed consensus.

Here, the multi-signature value may be generated using a combination of the sum of the multi-signature fragment values and a random number.

Also, in order to accomplish the above objects, an apparatus for distributed consensus using multi-signature according to an embodiment of the present disclosure includes one or more processors and executable memory for storing at least one program executed by the one or more processors. The at least one program may be configured to receive a Pre-Prepare message for processing distributed consensus on a transaction from a president node in a blockchain network, to send the president node a Prepare message, including a message authentication code that is necessary in order for the apparatus itself to be verified to be a legitimate node by the president node, to receive an A-Prepare message indicating that the apparatus itself and nodes participating in the distributed consensus are verified and agree on the distributed consensus from the president node, to send a Commit message including a multi-signature fragment value for generating a multi-signature value to the president node, and to receive an A-Commit message including the multi-signature value from the president node, thereby processing the distributed consensus on the transaction.

Here, the at least one program may generate the message authentication code using the node identifier thereof and the public key thereof.

Here, the at least one program may verify the signature of the A-Prepare message using the public key of the president node registered in a node information table stored in advance.

Here, the at least one program may send the Commit message including a message authentication code value to the president node.

Here, multi-signature fragment values may be generated from the private keys of nodes participating in the distributed consensus.

Here, the multi-signature value may be generated using a combination of the sum of the multi-signature fragment values and a random number.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
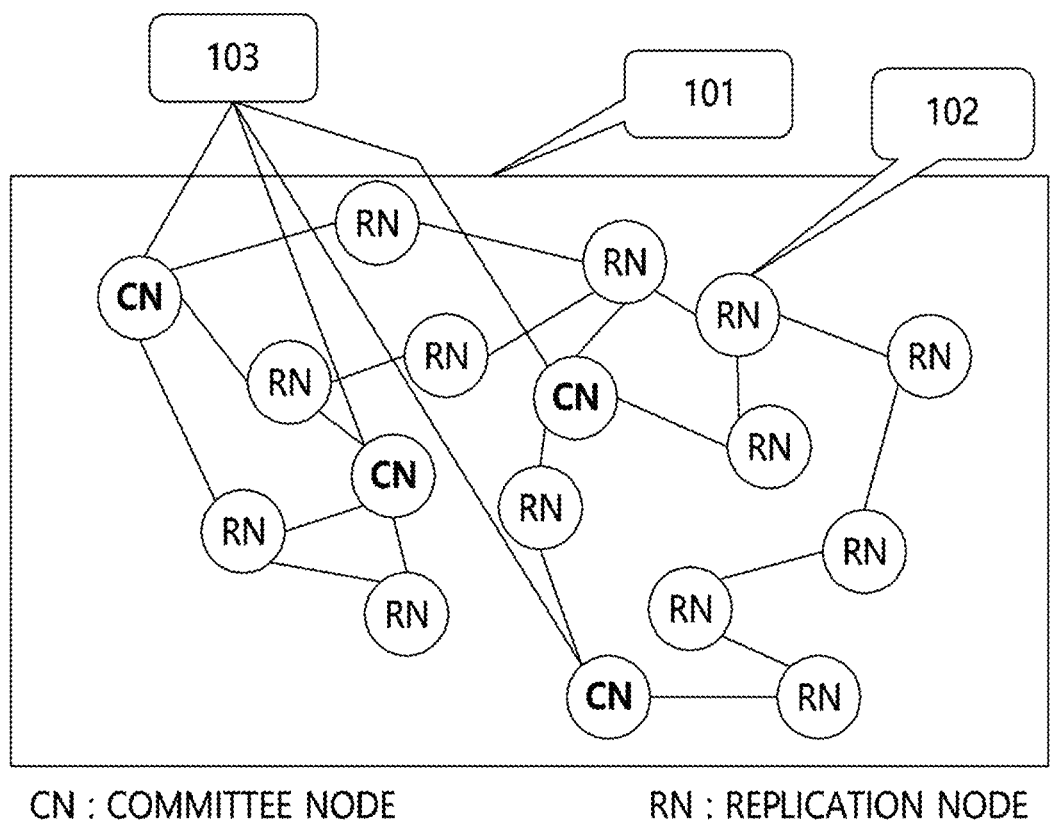
FIG. 1 is a view illustrating a distributed transaction-processing system for distributed consensus using multi-signature according to an embodiment of the present disclosure.

The present disclosure will be described in detail below with reference to the accompanying drawings. Repeated descriptions and descriptions of known functions and configurations that have been deemed to unnecessarily obscure the gist of the present disclosure will be omitted below. The embodiments of the present disclosure are intended to fully describe the present disclosure to a person having ordinary knowledge in the art to which the present disclosure pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified.

Hereinafter, a preferred embodiment of the present disclosure will be described in detail with reference to the accompanying drawings.

FIG. 1 is a view illustrating a distributed transaction-processing system for distributed consensus using multi-signature according to an embodiment of the present disclosure.

Referring to FIG. 1, it can be seen that a distributed transaction-processing system 101 configured with a large number of nodes that participate in consensus based on a committee is illustrated.

Nodes may be directly connected over a single network hop, and with an increase in the number of nodes, the nodes may be connected over a P2P network.

Each of the nodes may have a pair of (private key, public key) that is uniquely identified for the node.

Here, each of the nodes may have a node identifier for uniquely identifying the node, and may use a value derived from the public key of the node.

Here, each of the nodes has a state machine, and may update the state machine thereof by processing a transaction.

A transaction may be a single transaction, a set of transactions, or a batch of transactions, such as a block of a blockchain.

The nodes may be categorized as Committee Nodes (CN) or Replication Nodes (RN) depending on the roles thereof.

The roles of the nodes may change dynamically according to a specific period.

The committee nodes 103 constitute a set of nodes that will agree on the transaction to process, and may include a president node and member nodes.

The committee nodes may participate in consensus using a distributed consensus protocol that is publicly verifiable according to an embodiment of the present disclosure.

The transaction on which agreement has been reached may be transferred to all of the nodes, thereby being processed.

The replication nodes 102 are nodes that do not directly participate in consensus, and may receive the transaction that was agreed on, process the same, and record the same in the state machine thereof.

When it processes the transaction that was agreed on, the replication node first verifies whether the transaction was properly agreed on, and only when verification succeeds may the replication node execute the transaction and record the same in the state machine thereof.

Figure 2:
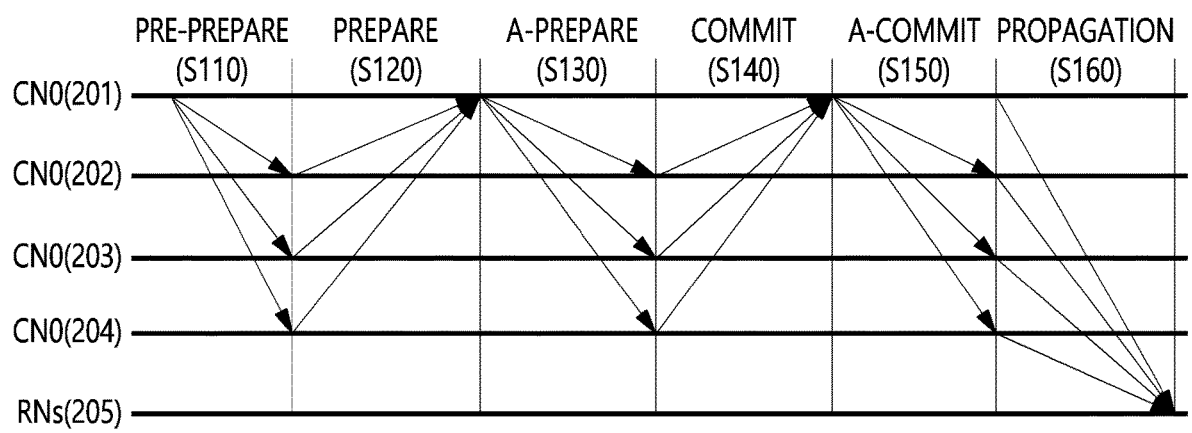
FIG. 2 is a view illustrating a distributed consensus protocol using multi-signature according to an embodiment of the present disclosure.

FIG. 2 is a view illustrating a distributed consensus protocol using multi-signature according to an embodiment of the present disclosure.

Referring to FIG. 2, in the method for distributed consensus using multi-signature according to an embodiment of the present disclosure, a consensus process based on protocol message exchange may be performed.

The distributed consensus protocol using multi-signature according to an embodiment of the present disclosure may be a protocol based on Practical Byzantine Fault Tolerance (PBFT).

The distributed consensus protocol using multi-signature according to an embodiment of the present disclosure may process distributed consensus using five messages, namely Pre-Prepare/Prepare/A-Prepare/Commit/A-Commit messages.

The distributed consensus protocol using multi-signature according to an embodiment of the present disclosure requires at least 3f+1 committee nodes in order to tolerate faults in f Byzantine nodes according to the Byzantine tolerance model of PBFT.

As shown in FIG. 2, when the number of Byzantine nodes is defined as f=1, the committee nodes include four nodes CN0 to CN3 (201 to 204), and one of them plays the role of a president node. Here, it can be seen that CN0 201 is a president node. The remaining nodes are member nodes 202 to 204.

The president node 201 may be a primary node from the aspect of the PBFT protocol, and the member nodes 202 to 204 may be backup nodes.

Nodes that are not included in the committee nodes are replication nodes 205.

When a transaction on which agreement is required occurs, the president node 201 may send a Pre-Prepare message to the member nodes 202 to 204 at step S110.

Table 1 is a table illustrating protocol messages according to an embodiment of the present disclosure.

TABLE 1

| message format | description |
|---|---|
| <<PRE-PREPARE, v, n, d> $\sigma_p$, enckey$_i$, m> | message for notifying backup nodes of transaction (message) that primary node (leader node) intends to process<br>v: view number<br>n: sequence number<br>d: message digest<br>enckey$_i$: one-time key value for node i, which is encoded using public key of backup node i<br>$\sigma_p$: signature of leader node<br>m: message |
| <<PREPARE, v, n, d, i, Q$_i$>, mac$_i$> | message sent by backup node i in order to notify leader of acceptance of PRE-PREPARE message sent by leader<br>i: ID of backup node<br>Q$_i$: value used for multi-signature, fragment of Q of node i<br>mac$_i$: Message Authentication Code value for PREPARE message |
| <A-PREPARE, v, n, d, Q, r, pk, Z> $\sigma_p$ | message sent by primary node to notify backup node i of collection of 2f or more PREPARE messages<br>Q: aggregated Q value of multi-signature<br>r: aggregated r value of multi-signature<br>pk: aggregated public key of multi-signature<br>Z: map of Q$_i$, including Q$_i$ values sent by backup nodes |
| <<COMMIT, v, n, d, s$_i$>, mac$_i$> | message sent by backup node i in order to notify leader of ability to commit<br>s$_i$: signature value of node i |
| <<A-COMMIT, v, n, d> $\sigma_p$, $\sigma_c$> | message sent by primary node in order to finally notify backup node of commit<br>$\sigma_c$: multi-signature for announcing that agreement on message m is reached normally |

A Pre-Prepare message may include the following information.

msg-id is information for identifying a message, and may indicate a Pre-Prepare message.

v may indicate a view number.

n may indicate a sequence number.

d is a message digest, and may indicate a value acquired by hashing part or all of the message.

enckey$_i$ may be a value acquired by encrypting key$_i$, which is an encryption key to be used when CN node i sends a message to a president node, using the public key of node i.

m is a message, and may indicate the target transaction to be agreed upon.

The Pre-Prepare message may include the signature $\sigma_p$ of the president node 201.

The member nodes 202 to 204 may verify whether the received Pre-Prepare message is valid, and may send a Prepare message to the president node at step S120 if the received Pre-Prepare message is valid.

The Prepare message may include the following information.

msg-id is information for identifying a message, and may indicate a Prepare message.

v may indicate a view number.

n may indicate a sequence number.

d is a message digest, and may indicate a value acquired by hashing part or all of the message.

$Q_i$ may indicate a fragment value of Q, which is generated by multiplying a random value $k_i$ on a given Elliptic Curve (EC) by a generator, and may be used for EC-Schnorr-based multi-signature.

The Prepare message may include $mac_i$, which is a Message Authentication Code (MAC) value.

The member nodes 202 to 204 may generate $mac_i$ by hashing the Prepare message using $key_i$ received from the president node 201.

Here, the president node 201 may verify whether the Prepare messages are sent by legitimate member nodes 202 to 204 using $mac_i$.

Because verification of digital signatures consumes a large amount of computing resources, verification time may be reduced using a MAC instead of digital signatures.

When it receives 2f Prepare messages, the president node 201 may send an A-Prepare message to the member nodes 202 to 204 at step S130.

The president node 201 may send an A-Prepare message to the member nodes 202 to 204, thereby notifying the member nodes 202 to 204 of reception of a sufficient number of Prepare messages to proceed to the next stage.

Here, each of the member nodes 202 to 204 may receive the A-Prepare message, indicating that the node itself and the nodes participating in the distributed consensus are validated and agree on the distributed consensus, from the president node 201.

The A-Prepare message may include the following information.

msg-id is information for identifying a message, and may indicate an A-Prepare message.

v may indicate a view number.

n may indicate a sequence number.

d is a message digest, and may indicate a value acquired by hashing part or all of the message.

Q may indicate the sum of $Q_i$ values.

r may indicate the r value of the EC-Schnorr digital signature value.

pk may indicate the sum of the public keys of the committee nodes.

Z may be a map of $Q_i$ values for the node identifiers that were used to generate Q, that is, Z may contain the $Q_i$ values sent by the respective committee nodes.

The A-Prepare message may include $\sigma_p$, which is the signature of the president node 201.

The member nodes 202 to 204 may verify whether the received A-Prepare message is valid, and may send a Commit message to the president node 201 at step S140 if the received A-Prepare message is valid.

The Commit message may include the following information.

msg-id is information for identifying a message, and may indicate a Commit message.

v may indicate a view number.

n may indicate a sequence number.

d is a message digest, and may indicate a value acquired by hashing part or all of the message.

$s_i$ may indicate a fragment of s, which is generated using Q, r, pk, and the private key of node i, and the multi-signature fragment values, $s_i$, are combined, whereby s, which is a component of the complete multi-signature, may be generated.

The Commit message may include $mac_i$, which is a Message Authentication Code (MAC) value.

The member nodes 202 to 204 may generate $mac_i$ by hashing the Commit message using $key_i$ received from the president node 201.

The president node 201 may verify whether the received Commit message is valid, and when it acquires all $s_i$ values, it may generate s therefrom.

The president node 201 may send an A-Commit message to the member nodes 202 to 204 at step S150.

The A-Commit message may include the following information.

msg-id is information for identifying a message, and may indicate an A-Commit message.

v may indicate a view number.

n may indicate a sequence number.

d is a message digest, and may indicate a value acquired by hashing part or all of the message.

The A-Commit message may include $\sigma_p$, which is the signature of the president node 201, and $\sigma_c$, which is the multi-signature value to be included when the transaction that is agreed on is propagated.

The committee node may send the transaction that is agreed on to the replication nodes 205 through P2P connection or direct connection at step S160.

Here, the committee node may send the A-Commit message including the multi-signature value for the transaction that is agreed upon.

The replication nodes 205 may reflect the transaction to the state machine thereof only when $\sigma_c$, which is the multi-signature value, is verified to be valid.

The distributed consensus protocol using multi-signature according to an embodiment of the present disclosure may use EC-Schnorr signature in order to generate a multi-signature.

All of the committee nodes possess a private key and a public key, which can be used for a digital signature. Also, all of the nodes using a digital signature may use the same EC curve parameter. For example, secp256k1 may be used as a representative EC curve parameter. The EC curve parameter may be written as follows.

C is an Elliptic curve to be used in common, and may be defined using a curve parameter such as secp256k1.

G may indicate a generator point on C.

n may indicate the order of G.

m is the message to be signed, and may correspond to a transaction.

$pk_i$ may indicate the public key of node i.

$sk_i$ may indicate the private key of node i.

$\sigma_i$ is a signature generated for m by node i, and may be configured with (r, s).

The EC-Schnorr multi-signature may use the following values.

$k_i$ may be a random value within the range [1, n−1], which is generated by node i.

$Q_i$ may indicate the Q value of node i, which is generated using $K_i$, and may be calculated as $[k_i] \cdot G$.

pk may indicate the sum of the public keys of nodes participating in multi-signature.

Q may indicate the sum of $Q_i$ values.

r is the r value of the final multi-signature, and may be calculated as $H(Q\|Pk\|m)$.

$s_i$ indicates a signature fragment of node i for s, which is generated using the private key of node i, and may be calculated as $s_i \leftarrow (k_i - r \cdot sk_i) \bmod n$.

s may indicate the sum of $s_i$ values.

σ is the multi-signature value generated based on multi-signature, and may be configured with (r, s).

σ may be generated using the sum of the public keys of the nodes participating in multi-signature.

Table 2 illustrates a node information table according to an embodiment of the present disclosure.

Table 3 illustrates a committee information table according to an embodiment of the present disclosure.

TABLE 2

| ID | PUBLIC KEY | KEY | ENCKEY |
|---|---|---|---|
| 1 | "fed0991 . . . " | "125def . . . " | "a89123 . . . " |
| 2 | cc"087aed1 . . . " | "ddde11 . . . " | "ea8365 . . . " |
| . . . | . . . | | |

TABLE 3

| ID | role |
|---|---|
| 1 | president |
| 2 | member |
| . . . | . . . |

Referring to Table 2, it can be seen that all nodes (committee nodes and replication nodes) maintain a node information table. The node information table is a table for storing basic information about a node, and may include a node identifier (ID), the public key of the node (PUBLIC KEY), encryption key information (KEY) to be used for a MAC, and encryption key information (ENCKEY) acquired by encrypting the MAC key with the public key of the node.

The node identifier may be an identifier for uniquely identifying the node.

For example, the node identifier may be generated by being derived from the public key.

The public key is a public key value according to a public key encryption scheme.

Figure 3:
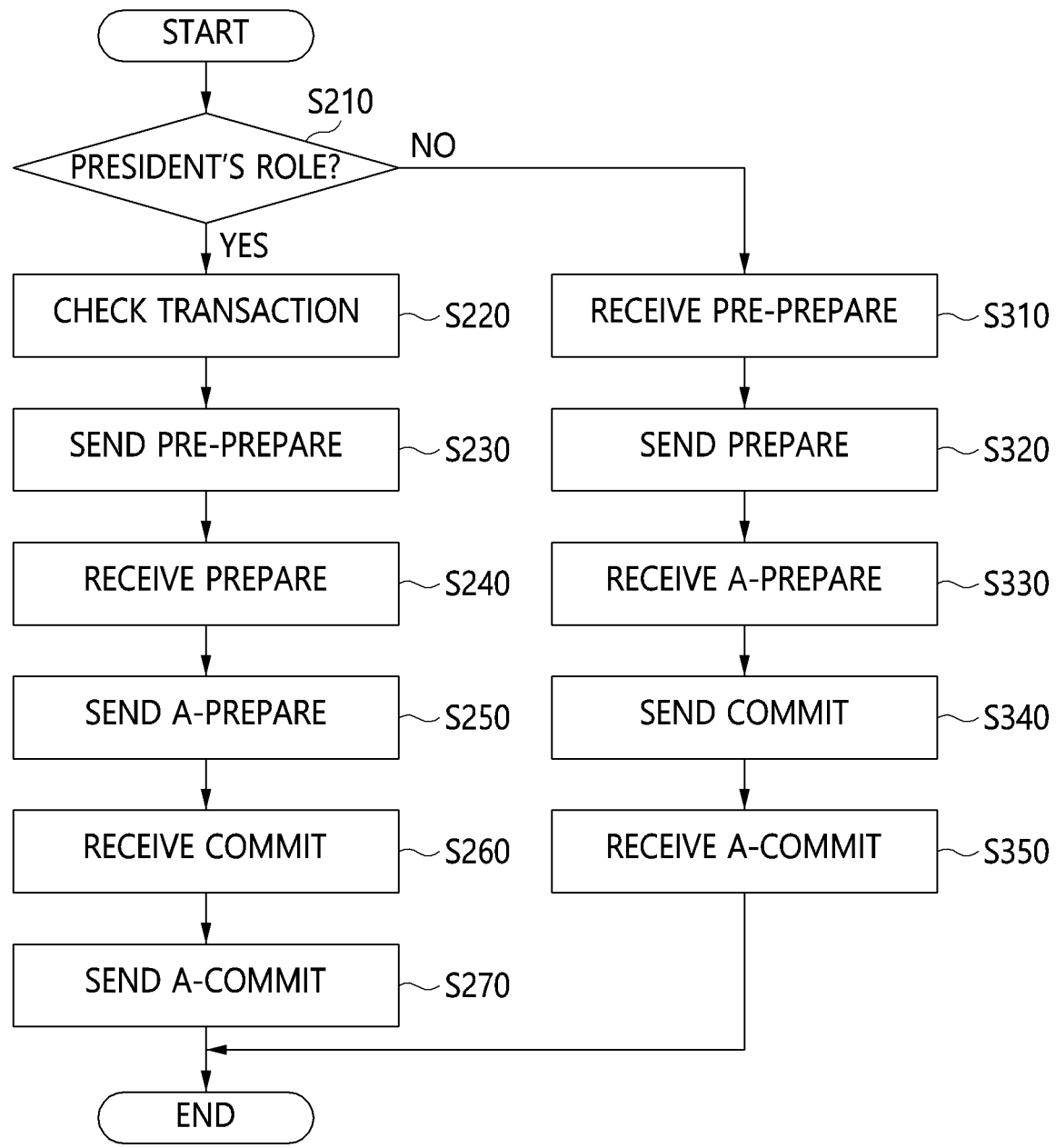
FIG. 3 is a flowchart illustrating a method for distributed consensus using multi-signature according to an embodiment of the present disclosure.

Referring to FIG. 3, when a dynamic committee is used in a consensus protocol, because the nodes constituting the committee may change in each session, the committee information table may be maintained for each session. The session indicates the period during which the committee processes consensus. The committee information of the past session may be deleted.

The committee information table may store the identifiers (ID) of nodes constituting the committee and the roles thereof. The public key, the MAC key, and the encryption key of each of the committee nodes may be acquired using the node information table illustrated in Table 2.

FIG. 3 is a flowchart illustrating a method for processing distributed consensus using multi-signature according to an embodiment of the present disclosure.

The method for processing distributed consensus using multi-signature according to an embodiment of the present disclosure may use basic parameters used in protocol operations, namely v, n, d, i, and m, without change.

v may indicate a view number.

n may indicate a sequence number.

d is a message digest, and may indicate a value acquired by hashing part or all of the message.

i indicates the i-th node id.

m is the message to be agreed on, and may indicate a transaction.

Referring to FIG. 3, committee nodes may check the roles thereof at step S210 when an operation is started.

At step S210, the roles of nodes may be statically or dynamically set depending on the distributed processing system.

Statically setting a role means that committee node information is fixed. For example, the committee node information may be given in advance as parameters when a system is run.

Dynamically setting a role means that the committee is changed according to a specific period. For example, in the case of a system such as a blockchain, the header of a block may be updated with information about a committee for generating a specific block.

Here, when a node becomes aware that the role thereof is a president at step S210, the node checks whether there is a transaction to process through distributed consensus at step S220, whereas when the role of the node is a member, the node may receive a Pre-Prepare message at step S310.

Here, at step S220, whether there is a transaction to be processed through distributed consensus may be checked.

Here, at step S220, whether the transaction is valid may be additionally checked by the node using the state machine thereof.

For example, at step S220, a transaction for withdrawing money exceeding a balance is not a valid transaction, and such a transaction may be excluded from the transactions to be agreed on.

Here, at step S220, consensus on transactions may be processed in units of a preset batch of transactions, and transactions may be batched into a block and then be processed as in a blockchain. The transaction to be agreed on may include a batch of transactions.

At step S230, a Pre-Prepare message may be generated and sent to the member nodes.

Here, the Pre-Prepare message may further include enckey$_i$.

enckey$_i$ is a value acquired by encoding key$_i$ using the public key of node i.

key$_i$ may be an encryption key to be used by node i, which is based on symmetric key cryptography, such as Advanced Encryption Standard (AES).

key$_i$ may be used later in order for a member node to generate a Message Authentication Code (MAC) when it sends a protocol message to the president node.

Here, at step S230, key$_i$ may be generated, and information such as key$_i$ and enckey$_i$ of the member node may be stored in the node information table.

Here, at step S230, because enckey$_i$ values, which are different for the respective nodes, are included in Pre-Prepare messages, different Pre-Prepare messages may be sent to the member nodes.

If a large number of nodes is present, it is necessary to generate a large number of enckey$_i$ values. Furthermore, computing enckey$_i$ values is time-consuming because a public key encryption scheme is used therefor.

Accordingly, at step S230, enckey$_i$ may be generated in advance in order to save computing time.

Here, at step S230, when each node acquires information pertaining to an additional node (the node identifier and public key information thereof), it may immediately generate an entry for the additional node in the node information table and store the key value and the enckey value of the additional node.

Here, at step S230, the president node may generate a Pre-Prepare message including v, n, d, $key_i$, $enckey_i$, and m, and send the same to the member nodes.

At step S240, the president node may receive Prepare messages from the member nodes.

Here, at step S240, the president node may wait until it receives 2f correct Prepare messages that match the Pre-Prepare message (2f being the number of nodes excluding the president node).

Here, at step S240, the Prepare messages may be verified.

Here, at step S240, whether v, n, and d included in the Prepare message are the same as those included in the Pre-Prepare message is checked, whereby whether the Prepare message is sent by a legitimate member node may be checked.

Here, at step S240, in order to check whether the message is sent by a legitimate member node, whether i, which is the node id included in the Prepare message, is present in the committee information table may be checked.

Here, at step S240, when i, which is the node id, is present in the committee information table, $key_i$ of node i may be acquired from the node information table in order to check a MAC.

Here, at step S240, the received Prepare message is hashed using $key_i$, and the hash value may be compared with $mac_i$.

Here, at step S240, if the hash value is the same as $mac_i$, the received Prepare message may be verified to be a valid one.

Here, at step S240, the above process may be performed until 2f correct Prepare messages are received.

$Q_i$ included in the Prepare message may be mapped to the node id and stored in the memory. This is called a set of signers, S. The president node may also generate $Q_i$ thereof and include the same in the set of signers. S may be a list configured with <node id, $Q_i$, $s_i$>. Here, $Q_i$ is a value that is necessary in order to generate a multi-signature that is included in order to prove that consensus is properly performed when the consensus is completed.

At step S250, an A-Prepare message for notifying each of the member nodes of the fact that verifying other committee nodes based on the Prepare messages is completed may be sent to the member nodes.

Because the member nodes do not directly exchange messages, this has to be announced by the president node.

Here, at step S250, the president node may first set v, n, and d, and may calculate Q, r, pk, and Z using Pseudocode 1.
[Pseudocode 1]

$$Q <\_ \sum Q_i$$
$$pk <\_ \sum_{s \in S} pk_i \text{ of } s$$

r<–H(Q∥pk∥m)
Z<–list of <id, $Q_i$> of S

Here, at step S250, an A-Prepare message, including Q, r, pk, and Z, may be generated, signed ($\sigma_p$) with the private key of the president node, and sent to the member nodes.

At step S260, Commit messages may be received from the member nodes.

Here, at step S260, $s_i$ fragments of the member nodes may be collected from the received Commit messages in order to generate a multi-signature.

The $s_i$ values may be recorded in S, which is a set of signers.

The $s_i$ fragments are multi-signature fragments for Q.

Here, at step S260, the Commit messages may be received from all of the nodes included in S.

Here, at step S260, the Commit message may be verified.

Here, at step S260, whether v, n, and d in the Commit message are the same as those in the A-Prepare message and whether the Commit message is sent by a legitimate committee node may be verified.

Here, at step S260, whether the Commit message is sent by a legitimate member node may be verified using $mac_i$ included in the Commit message.

Here, at step S260, in order to verify whether the Commit message is sent by a legitimate member node, whether i, which is the node id included in the Commit message, is present in the committee information table may be checked.

Here, at step S260, when i, which is the node id, is present in the committee information table, $key_i$ corresponding to node i may be acquired from the node information table in order to check a MAC.

Here, at step S260, the received Commit message is hashed using $key_i$, and the hash value may be compared with $mac_i$.

Here, at step S260, when the hash value is the same as $mac_i$, the received Commit message may be verified to be valid.

At step S270, success in consensus on the transaction, m, is announced, and a proof that can be publicly verified may be produced.

Here, at step S270, a multi-signature, which is a publicly verifiable proof, may be produced.

Here, at step S270, the president node may generate s from S, which is the set of signers, as shown in Pseudocode 2.
[Pseudocode 2]

$$s <\_ \sum_{s \in S} s_i \text{ of } S$$

Here, at step S270, an A-Commit message including v, n, d, and $\sigma_c$, which is a multi-signature value, is generated and sent to the member nodes, whereby consensus on the transaction may be processed.

Here, $\sigma_c$ may be (r, s).

Also, at step S210, when the role of a node is a member, the node may receive a Pre-Prepare message at step S310.

Here, at step S310, the node may wait for a Pre-Prepare message sent by the president node, and if the Pre-Prepare message is not received within a preset time, the node may start a view change procedure according to the existing PBFT-protocol-processing procedure.

Here, at step S310, the received Pre-Prepare message may be verified.

Here, at step S310, v, n, and d in the received Pre-Prepare message are checked, the public key of the president node is acquired using the node information table and the committee information table, and $\sigma_p$, which is the digital signature of the president node, may be verified using the acquired public key.

At step S320, a Prepare message for announcing acceptance of the Pre-Prepare message received from the president node may be generated and sent to the president node.

The Prepare message may include v, n, d, i, $Q_i$, and $mac_i$.

v, n, and d may be set to be the same as those included in the Pre-Prepare message.

i is the id of the node. $Q_i$ is a value used for a multi-signature, and $mac_i$ is a value used to verify whether the node sending the Prepare message is a legitimate node.

$mac_i$ may be calculated using $key_i$, which is a shared key. $key_i$ may be acquired by decoding $enckey_i$ using the private key of the node.

$Q_i$ and $mac_i$ may be calculated as shown in Pseudocode 3.

[Pseudocode 3]

$key_i$<–decode ($enckey_i$, $sk_i$)
$k_i$<–R[1, n–1]
$Q_i$<–[$k_i$]·G
$mac_i$<–HMAC(<PREPARE, v, n, d, $key_i$)

HMAC means a keyed-hash message authentication code or a hash-based message authentication code using hashing. R[1, n–1] is a random number within a range from 1 to n–1. G is a generator. $mac_i$ may be represented as a value acquired by hashing the Prepare message using $key_i$.

At step S330, an A-Prepare message may be received from the president node.

Here, at step S330, the A-Prepare message indicating that the node itself and the nodes participating in the distributed consensus are verified and agree on the distributed consensus may be received.

Here, at step S330, the node waits for reception of the A-Prepare message until a preset specific timeout.

Here, at step S330, when the specific timeout expires, the node may resend the previously sent Prepare message to the president node and reset the timeout value.

Here, at step S330, if an A-Prepare message is not received even though the Prepare message was resent multiple times, a view change procedure may be started.

Here, at step S330, the received A-Prepare message may be verified.

Here, at step S330, the signature $\sigma_p$ may be verified in order to check whether the received A-Prepare message is sent by the president node, and whether v, n, and d included in the A-Prepare message are correct may be verified by comparing the same with v, n, and d included in the Pre-Prepare message.

Here, at step S330, the signature of the A-Prepare message may be verified using the public key of the president node registered in the node information table stored in advance.

Here, at step S530, r, which is one of the components of the multi-signature, is verified, and whether the information sent by the node itself, that is, information of the node (node id, $Q_i$), is correctly included in Z may be checked. r may be verified as shown in Pseudocode 4.

[Pseudocode 4]

r'<–H (Q∥pk∥m)
check r'==r

At step S340, a Commit message may be generated and sent to the president node.

The Commit message may include v, n, d, $s_i$, and $mac_i$, which is a MAC for the Commit message.

v, n, and d may be set to be the same as those included in the Pre-Prepare message.

$s_i$ and $mac_i$ may be set as shown in Pseudocode 5.

$key_i$ is a value calculated from $enckey_i$ when the Pre-Prepare message is received.

[Pseudocode 5]

$s_i$<–($k_i$–r·$sk_i$) mod n
$mac_i$<–HMAC (<COMMIT, v, n, d, $s_i$>, $key_i$)

$mac_i$ is a value acquired by hashing the Commit message using $key_i$.

At step S350, whether the A-Commit message received from the president node is valid may be verified.

Here, at step S350, whether v, n, and d included in the A-Commit message are the same as those included in the Pre-Prepare message may be checked, the digital signature, $\sigma_p$, may be verified, and the multi-signature, $\sigma_c$, may be verified using pk information acquired at the time of receiving the A-Prepare message.

Here, at step S350, when verification succeeds, the transaction that is agreed upon may be transmitted to the replication nodes.

Here, at step S350, proof information for ensuring that the consensus is properly verified may be transmitted along with the transaction.

The proof information may include Z and $\sigma_c$. The replication node may check the nodes participating in the signature using Z, and may reconfigure pk by combining the public keys ($pk_i$) of the corresponding nodes. Then, the replication nodes may verify the multi-signature $\sigma_c$ using pk.

Figure 4:
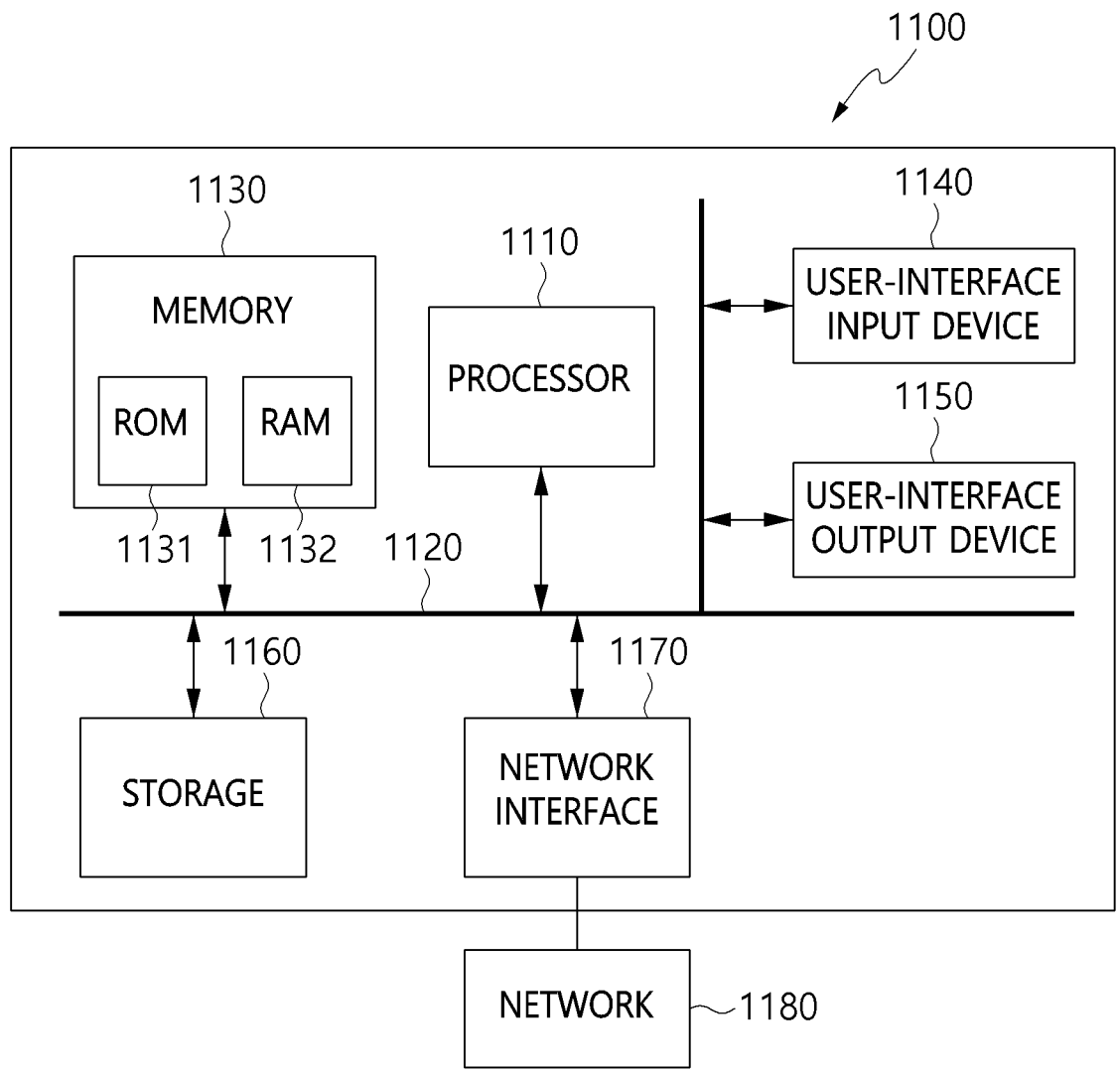
FIG. 4 is a view illustrating a computer system according to an embodiment of the present disclosure.

FIG. 4 is a view illustrating a computer system according to an embodiment of the present disclosure.

Referring to FIG. 4, the apparatus for distributed consensus using multi-signature, corresponding to committee nodes, including a president node and member nodes, on a blockchain network according to an embodiment of the present disclosure may be implemented in a computer system 1100 including a computer-readable recording medium. As illustrated in FIG. 4, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be any of various types of volatile or nonvolatile storage media. For example, the memory may include ROM 1131 or RAM 1132.

The apparatus for distributed consensus using multi-signature corresponding to a president node according to an embodiment of the present disclosure may include one or more processors 1110 and executable memory 1130 for storing at least one program executed by the one or more processors 1110, and the at least one program may send a Pre-Prepare message for processing distributed consensus on a transaction to nodes participating in the distributed consensus in a blockchain network, verify the nodes using Message Authentication Code (MAC) values included in Prepare messages received from the nodes, send the nodes an A-Prepare message for announcing that a number of successfully verified nodes equal to or greater than a quorum required for the distributed consensus sent the Prepare message, generate a multi-signature value using multi-signature fragment values included in Commit messages received from the nodes, and send an A-Commit message including the multi-signature value to the nodes, thereby processing consensus on the transaction.

Here, the at least one program may acquire the public keys of the nodes from a node information table stored in advance, and may verify the nodes by comparing message authentication codes generated from the acquired public keys with the message authentication code values included in the Prepare messages.

Here, the at least one program may sign the A-Prepare message with the private key thereof.

Here, the at least one program may verify the nodes using the message authentication codes included in the Commit messages.

Here, the multi-signature fragment values may be generated from the private keys of the nodes participating in the distributed consensus.

Here, the multi-signature value may be generated using a combination of the sum of the multi-signature fragment values and a random number.

The apparatus for distributed consensus using multi-signature corresponding to a member node according to an embodiment of the present disclosure may include one or more processors 1110 and executable memory 1130 for storing at least one program executed by the one or more processors 1110, and the at least one program may receive a Pre-Prepare message for processing distributed consensus on a transaction from a president node in a blockchain network, send the president node a Prepare message including a message authentication code that is necessary in order for the apparatus itself to be verified to be a legitimate node by the president node, receive an A-Prepare message indicating that the apparatus itself and nodes participating in the distributed consensus are verified and agree on the distributed consensus from the president node, send a Commit message, including a multi-signature fragment value for generating a multi-signature value, to the president node, and receive an A-Commit message including the multi-signature value from the president node, thereby processing the distributed consensus on the transaction.

Here, the at least one program may generate the message authentication code using the node identifier thereof and the public key thereof.

Here, the at least one program may verify the signature of the A-Prepare message using the public key of the president node registered in the node information table stored in advance.

Here, the at least one program may generate the Commit message including a message authentication code value to the president node.

Here, multi-signature fragment values may be generated from the private keys of the nodes participating in the distributed consensus.

Here, the multi-signature value may be generated using a combination of the sum of the multi-signature fragment values and a random number.

The present disclosure may minimize the consensus delay time required for agreement on a block in a blockchain network and improve transaction-processing performance.

As described above, the apparatus and method for distributed consensus using multi-signature according to the present disclosure are not limitedly applied to the configurations and operations of the above-described embodiments, but all or some of the embodiments may be selectively combined and configured, so the embodiments may be modified in various ways.

What is claimed is:

1. An apparatus for distributed consensus using multi-signature, comprising:
one or more processors; and
executable memory for storing at least one program executed by the one or more processors,
wherein the at least one program is configured to:
send a Pre-Prepare message for processing distributed consensus on a transaction to each node in a plurality of nodes participating in the distributed consensus in a blockchain network,
receive, respectively, a plurality of Prepare messages responsive to the Pre-Prepare message from the plurality of nodes,
in response to receiving the plurality of Prepare messages, verify the plurality of nodes using message authentication code values included in the plurality of Prepare messages,
send each node in the plurality of nodes an A-Prepare message for announcing that the Prepare messages are received from a number of successfully verified nodes equal to or greater than a quorum required for the distributed consensus,
receive a plurality of Commit messages responsive to the A-Prepare message from the plurality of nodes, respectively,
in response to receiving the plurality of Commit messages, generate a multi-signature value using a plurality of respective multi-signature fragment values included in the plurality of Commit messages, and
send an A-Commit message including the multi-signature value to each node in the plurality of nodes, thereby processing consensus on the transaction,
wherein the at least one program signs the A-Prepare message with a private key thereof, and
wherein a signature of the A-Prepare message is verified by the plurality of nodes using a public key thereof registered in a node information table stored in advance.

2. The apparatus of claim 1, wherein the at least one program acquires public keys of the nodes from a node information table stored in advance and verifies the nodes by comparing message authentication codes generated from the public keys with the message authentication code values included in the Prepare messages.

3. The apparatus of claim 2, wherein the at least one program verifies the nodes using message authentication codes included in the Commit messages.

4. The apparatus of claim 1, wherein the multi-signature fragment values are generated from private keys of the nodes participating in the distributed consensus.

5. The apparatus of claim 4, wherein the multi-signature value is generated using a combination of a sum of the multi-signature fragment values and a random number.

6. A method for distributed consensus using multi-signature, performed by an apparatus for distributed consensus using multi-signature, comprising:
sending a Pre-Prepare message for processing distributed consensus on a transaction to each node in a plurality of nodes participating in the distributed consensus in a blockchain network;
receiving, respectively, a plurality of Prepare messages responsive to the Pre-Prepare message from the plurality of nodes,
in response to receiving the plurality of Prepare messages, verifying the plurality of nodes using message authentication code values included in the plurality of Prepare messages;
sending each node in the plurality of nodes an A-Prepare message for announcing that the nodes are verified and that the Prepare messages are received from a number of verified nodes equal to or greater than a quorum required for the distributed consensus;
receive a plurality of Commit messages responsive to the A-Prepare message from the plurality of nodes, respectively,
in response to receiving the plurality of Commit messages, generating a multi-signature value using a plurality of respective multi-signature fragment values included in the plurality of Commit messages; and sending an A-Commit message including the multi-signature value to each node in the plurality of nodes, thereby processing consensus on the transaction, wherein sending the A-Prepare message comprises signing the A-Prepare message with a private key of the apparatus, and wherein a signature of the A-Prepare message is verified by the plurality of nodes using a public key of the apparatus registered in a node information table stored in advance.

7. The method of claim 6, wherein verifying the nodes comprises acquiring public keys of the nodes from a node information table stored in advance and verifying the nodes by comparing message authentication codes generated from the public keys with the message authentication code values included in the Prepare messages.

8. The method of claim 7, wherein generating the multi-signature value comprises verifying the nodes using message authentication codes included in the Commit messages.

9. The method of claim 6, wherein the multi-signature fragment value are generated from private keys of the nodes participating in the distributed consensus.

10. The method of claim 9, wherein the multi-signature value is generated using a combination of a sum of the multi-signature fragment values and a random number.

11. An apparatus for distributed consensus using multi-signature, comprising:

one or more processors; and executable memory for storing at least one program executed by the one or more processors, wherein the at least one program is configured to;

receive, from a president node in a blockchain network, a Pre-Prepare message for processing distributed consensus on a transaction, in response to receiving the Pre-Prepare message, send the president node a Prepare message, including a message authentication code that is necessary in order for the apparatus itself to be verified to be a legitimate node by the president node, receive, from the president node, an A-Prepare message indicating that the apparatus itself and nodes participating in the distributed consensus are verified and agree on the distributed consensus, in response to receiving the A-Prepare message, send a Commit message including a multi-signature fragment value for generating a multi-signature value to the president node, and receive, from the president node, an A-Commit message including the multi-signature value, thereby processing the distributed consensus on the transaction, wherein the at least one program verifies a signature of the A-Prepare message using a public key of the president node registered in a node information table stored in advance.

12. The apparatus of claim 11, wherein the at least one program generates the message authentication code using a node identifier thereof and a public key thereof.

13. The apparatus of claim 12, wherein the at least one program sends the Commit message including a message authentication code value to the president node.

14. The apparatus of claim 11, wherein the at least one program generates the multi-signature fragment value using a private key of the apparatus.

15. The apparatus of claim 14, wherein the multi-signature value is generated using a combination of a sum of a multi-signature fragment values and a random number.

* * * * *